Dec. 28, 1948.    T. H. THOMAS    2,457,750
POWER STEERING MECHANISM
Filed Sept. 4, 1945    3 Sheets-Sheet 1
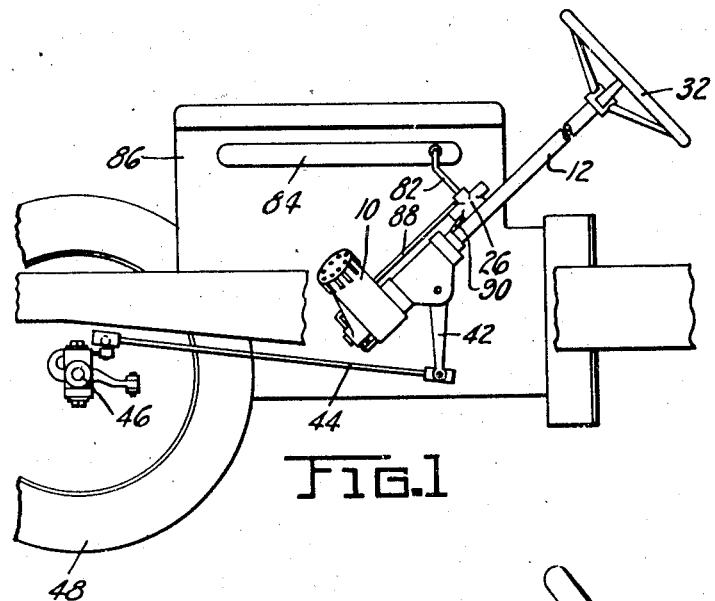
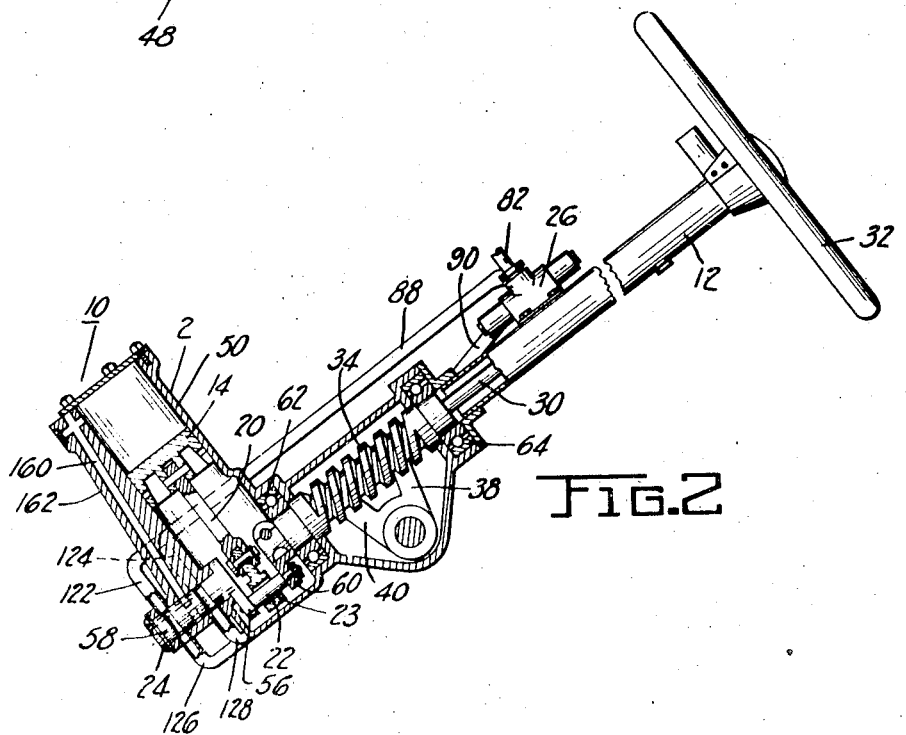
INVENTOR.
THOMAS H. THOMAS
BY H. O. Clayton
ATTORNEY Dec. 28, 1948.　　　　T. H. THOMAS　　　　2,457,750
POWER STEERING MECHANISM Filed Sept. 4, 1945　　　　　　　　　　　　3 Sheets-Sheet 2

INVENTOR.
THOMAS H. THOMAS
BY
H. O. Clayton
ATTORNEY

Dec. 28, 1948.  T. H. THOMAS  2,457,750
POWER STEERING MECHANISM
Filed Sept. 4, 1945  3 Sheets-Sheet 3

INVENTOR.
THOMAS H. THOMAS
BY H. O. Clayton
ATTORNEY

Patented Dec. 28, 1948

2,457,750

UNITED STATES PATENT OFFICE 2,457,750

POWER STEERING MECHANISM

Thomas H. Thomas, South Bend, Ind., assignor to Bendix Aviation Corporation, South Bend, Ind., a corporation of Delaware Application September 4, 1945, Serial No. 614,319

7 Claims. (Cl. 180—79.2)

This invention relates in general to steering mechanism and in particular to a pressure differential operated power means for operating the steering mechanism of an automotive vehicle.

The principal object of my invention is to provide, in the power plant of an automotive vehicle, an engine consisting of a plurality of pressure differential operated motors said engine serving to supplement the physical effort of the driver in the operation of steering the vehicle.

Yet another object of my invention is to provide means, including a plurality of single-acting pressure differential operated motors, for aiding the physical effort of the driver in the operation of steering an automotive vehicle said motors being controlled in part by a solenoid operated valve mechanism which may be referred to as a master valve.

A further object of my invention is to provide a simple and effective power means for supplementing the physical effort of the driver of an automotive vehicle in the operation of steering said vehicle said power means including a multi-motored vacuum engine preferably mounted on the end of the steering column of the vehicle said engine being controlled by a rotary distributor valve and a steering wheel controlled electromagnetically operated master valve operable to initiate the operation of said distributor valve and further operable, by a follow-up operation of the mechanism to automatically cut off the operation of the power means when the steering movement of the steering wheel is arrested.

A further object of my invention is to provide power means for supplementing the physical effort of the driver in the operation of steering an automotive vehicle said power means including a plurality of pressure differential operated motors controlled by a rotary valve mechanism preferably mounted at the base of the steering column the operation of said motors being iniated by the operation of an electrically operated master control valve operated by the driver when he turns the steering wheel.

One of the important objects of my invention is to provide a simple yet effective combined manually and power operated mechanism for effecting the steering operation of an automotive vehicle, said mechanism being easily serviced and including but a minimum of moving parts.

Yet another object of my invention is to provide a steering mechanism for actuating the steering wheels of an automotive vehicle said mechanism being capable of effecting either a combined power and manual operation of said steering wheels or an operation of said wheels solely by the physical effort of the driver in the event of failure of the power means.

A further object of my invention is to provide a compact power and manually operated mechanism which may be mounted upon the steering post of an automotive vehicle said mechanism serving to actuate the pitman arm of the steering mechanism of the vehicle.

Other objects and advantages of the invention are referred to in connection with the following detailed description of the accompanying drawings which represent a preferred embodiment of the invention. After considering these examples, skilled persons will understand that many variations may be made without departing from the principles disclosed; and I contemplate the employment of any structures, arrangements, or modes of operation that are properly within the scope of the appended claims.

Figure 1 is a diagrammatic view of the combined manually and power operated steering mechanism constituting my invention;

Figure 2 is a view, largely in section, disclosing the principal features of the mechanism constituting my invention;

Figure 10:
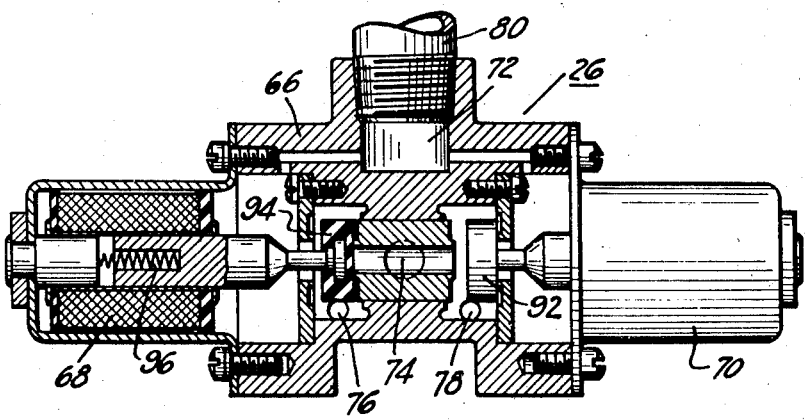
Figure 7:
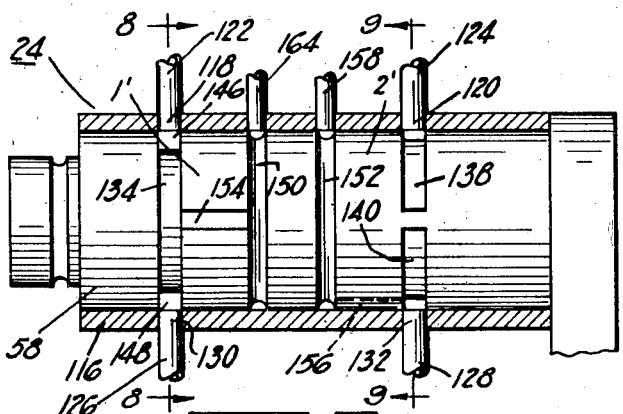
Figure 7 is a sectional view disclosing details of the rotary distributor valve for controlling the operation of the pressure differential operated motors of the mechanism.
Figure 8:
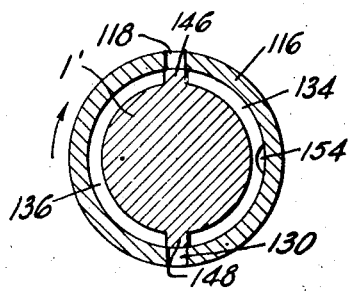
Figure 9:
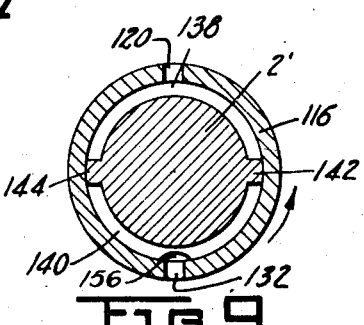

Figures 8 and 9 are sectional views, taken on the lines 8—8 and 9—9 respectively of Figure 7, disclosing further details of the rotary distributor valve of my invention; and Figure 10 is a sectional view disclosing details of the solenoid operated master control valve of my invention.

Figure 3:
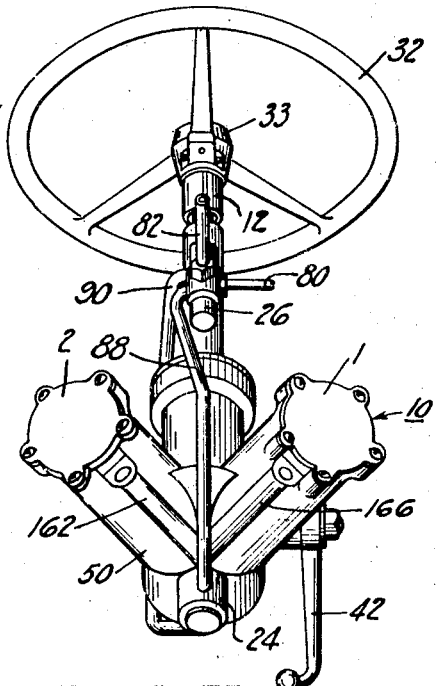
Figure 3 is a front view of the power steering mechanism constituting my invention said view disclosing the two pressure differential operated motors of the so-called vacuum engine of the invention.
Figure 4:
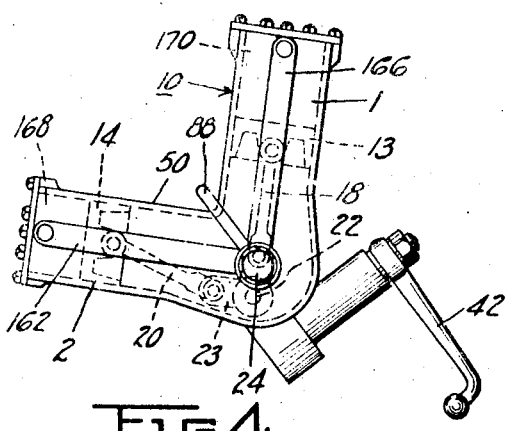
Figure 4 is a front elevational view disclosing details of the two motors of my invention.

Referring now to Figure 1 disclosing the principal elements of a preferred embodiment of my invention, a two motor engine 10 is mounted on the end of a steering column 12. The motors of said unit, which are preferably vacuum operated and single acting, are indicated by the reference numerals 1 and 2 in Figures 3 and 4 and the power elements 13 and 14 of said motors are preferably operably connected, by connecting rods 18 and 20 respectively, with a crankshaft 22 the connection being effected by means of a bell crank lever 23; and said motors are controlled by a rotary distributor valve unit 24, shown in detail in Figures 7, 8 and 9, and a power operated master valve unit 26 disclosed in detail in Figure 10.

A two-part steering post 30 within the steering column 12 is rotated by a steering wheel 32 and to the lower end of said post there is secured a worm member 34 which meshes with pins, not shown, mounted on the ends of crank arms 38 and 40; and the latter members are operably connected to a so-called pitman arm 42 which is in turn connected, by a drag link 44 to other parts of the conventional steering mechanism 46 of an automotive vehicle. This steering mechanism serves to rotate the front wheels of the vehicle one of said wheels being indicated by the reference numeral 48 in Figure 1.

As disclosed in Figures 1, 2, 3 and 4 the engine 10 comprises a one-piece casing 50 housing the distributor valve 24 and the pistons 13 and 14 and said pistons, as described above, are operably connected by connecting rods 18 and 20 respectively with the crankshaft 22. As disclosed in Figure 2 this crankshaft 22 is operably connected by means of a crank 56, to a cylindrically shaped rotatable valve member 58 constituting the principal part of the aforementioned so-called distributor valve 24; and said crankshaft 22 is also connected, by a crank 60, with the lower end of the worm 34 the latter being rotatably mounted, by bearings 62 and 64, in a part of the aforementioned motor casing 50.

Describing now the valvular means for controlling the operation of the motors 1 and 2 of my invention the master valve 26, disclosed in detail in Figure 10, includes a casing 66 having mounted thereon solenoids 68 and 70. This casing is provided with ports 72, 74, 76 and 78 connected respectively with a conduit 80 vented to the atmosphere via an air cleaner, not shown, a conduit 82 which is connected with the intake manifold 84 of the internal combustion engine 86 of the vehicle, a conduit 88 connected with the distributor valve 24 and a conduit 90 also connected with said distributor valve. As disclosed in Figure 10 valve members 92 and 94 of this master control valve 26 are actuated by the armatures of the solenoids 68 and 70 and by springs within said solenoids. These springs, one of which is indicated by the reference numeral 96, serve to bias the valve members to their valve closed position that is the position to connect the distributor valve 24 with the atmosphere.

Figure 5:
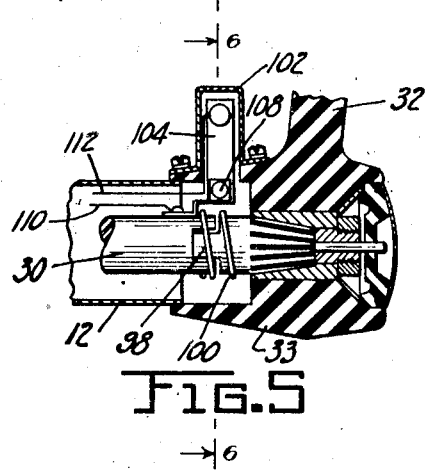
Figure 5 is a longitudinal sectional view of the hub of the steering wheel and associated parts constituting part of the control means of my invention.
Figure 6:
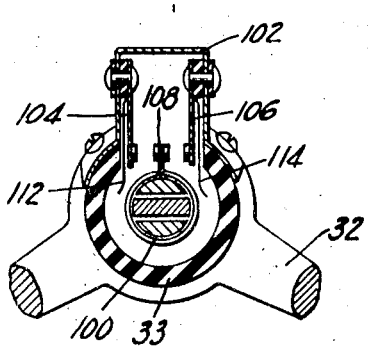
Figure 6 is a transverse sectional view, taken on the line 6—6 of Figure 5, disclosing details of the control switch of my invention.

Describing now the switch mechanism for controlling the operation of the solenoids 68 and 70 this mechanism is mounted within and adjacent to the hub portion 33 of the steering wheel 32 of the vehicle. Referring to Figures 5 and 6 the upper end of the steering post 30 is made in two sections there being a certain amount of lost motion between tongue and groove interfitting parts, said lost motion being indicated by the reference numeral 98. One end of a torsion spring 100, encircling the lost motion area of the aforementioned two parts of the steering post, is secured to the lower of said steering post parts and the other end of said spring is secured to the upper one of said parts. The spring 100, together with the junction between the parts of the steering post, provides what may be termed a yieldable lost motion connection. A switch housing member 102, preferably a stamping, is detachably secured to and covers an opening in the hub 33 of the steering wheel 32 and to said member 102 there is secured movable switch contact members 104 and 106. A fixed contact member 108 is secured to the lower part of the post 30 and is wired, by a wire 110, to the ignition switch, not shown, of the electrical system of the vehicle thereby providing what is defined in the art as a hot wire connection to a source of electrical current. The switch contacts 104 and 106 are wired, by wires 112 and 114 respectively, to the grounded solenoids 68 and 70 of the power operated master switch 26.

Describing the operation of the switch mechanism 104, 106, 108 the parts of the switch and operating means therefor are so constructed and arranged that when the steering wheel 32 is in its so-called released position, that is when the driver removes his hands from said wheel, then the switch contacts, by virtue of the operation of the torsion spring 100, assume the position disclosed in Figures 5 and 6 that is the switch open position; and as will be described hereinafter the switch mechanism may be closed when the driver rotates the steering wheel to effect a steering movement of the front wheels.

Describing now the details of the so-called distributor valve 24 disclosed in Figures 7, 8 and 9, the casing 116 of said valve, which is preferably integral with a part of the motor casing 50, is ported at 118 and 120 to receive branch conduits 122 and 124 respectively said conduits being connected to the lower end of the conduit 88; and the lower end of conduit 90, Figure 2, is likewise branched out to provide conduit sections 126 and 128 said sections being connected to ports 130 and 132 respectively in the valve casing 116. As disclosed in Figures 7, 8 and 9 the valve 58 is provided with opposed recesses 134 and 136 in a portion of the same indicated by the numeral 1'; and this portion of the valve serves to control the operation of the aforementioned number one motor. Motor number two of the two-motored engine 10 is controlled by the upper half portion of the valve 58 indicated by the reference numeral 2', Figure 7; and the latter valve portion is provided with opposed recesses 138 and 140 separated by full bodied portions of the valve indicated by the reference numerals 142 and 144. The recesses 134 and 136 of the valve portion 1' are separated by full bodied portions indicated by the reference numerals 146 and 148. The valve portions 1' and 2', hereinafter described as valves 1' and 2', are provided respectively with annular recesses 150 and 152 the recess 150 being placed in air transmitting connection with the recess 134 by a recess 154 and the recess 152 being placed in air transmitting connection with the recess 140 by a recess 156. The recess 152 registers with a port 158 in the valve casing said port registering with a duct 160 in a boss 162, in the casing of the motor 2, figure 2; and the recess 150 registers with a port 164 in the valve casing said port registering with a duct, not shown, in a boss 166 extending from the casing of the motor 1.

Describing now the operation of the power steering mechanism constituting my invention with a normal driving of the car, for example when the same is being driven on the crown of a relatively dry and well paved highway, the resistance to movement of the front wheels is relatively light accordingly when the steering wheel is rotated there is no distortion of the spring 100 to take up the lost motion 98 and effect a closure of the switch mechanism; however when the vehicle is mired in mud or parked in a place requiring considerable force to turn the front wheels then a rotation of the steering wheel results in a distortion of said spring to take up said lost motion and thereby close one or the other of the switches 104, 108 or 106, 108 depending of course upon the direction of rotation of said steering wheel.

It will be assumed, for the purpose of this description, that the switch 106, 108 is closed resulting in an energization of the solenoid 70 and an opening of the valve 92 to the position disclosed in Figure 10. The solenoid 68 is at the time deenergized and accordingly the valve 94 is closed with the result that the conduit 88 is vented to the atmosphere via conduit 80; and the conduit 90 being then connected with the intake manifold as a source of vacuum it follows that an operation of the distributor valve 24 is initiated. Referring now to Figures 4, 7, 8 and 9 it will be further assumed for the purpose of this description that when the above described power operation of the mechanism is initiated valves 1' and 2' and the parts connected thereto are in the position disclosed in said figures. A control compartment 168 of the motor 2 is then connected to the vacuum source via duct 160, port 158, recesses 152, 156 and 140, port 132, conduits 128 and 90 and the master valve 26; and a very short time later, that is after the land 148 has rotated clockwise, Figure 8, to uncover the port 130, a control compartment 170 of the motor 1 is connected to the vacuum source. The inertia of the pistons and connected parts is such that the then energized motor 2 with its upwardly moving piston 14 overcomes any slight momentary energization, if any, of the motor 1 as the piston 13 is moving at the bottom of its stroke.

Continuing the description of a cycle of operations of motors 1 and 2 the parts of the mechanism, particularly the parts of the valves 1' and 2', are so constructed and arranged and so operative that the motors 1 and 2 are then energized and deenergized respectively, said motors are then both deenergized and lastly motor 1 remains deenergized and motor 2 is again energized. These operations will be apparent from a study of Figures 8 and 9 it being noted that the valve 1', during this cycle, is rotating clockwise, as indicated by the arrow in Figure 8, and the valve 2' of Figure 9 is rotating counterclockwise as indicated by the arrow in Figure 9. The latter operation is explained by the fact that Figure 9 is a section taken on line 9—9 of Figure 7. The above described energization of the motors 1 and 2 results of course in the power operation of the cranks 56 and 60, Figure 2, to rotate the valve 58 and the worm 34; and this operation is continued so long as the master valve 26 is kept open by the operation of the steering wheel; and this operation consists of maintaining enough force on the steering wheel to keep the spring 100 distorted to thereby keep the control switch closed. If the movement of the steering wheel is arrested before the steering operation is completed then an engine cut-off follow-up operation of the mechanism is automatically effected, that is the power driven lower portion of the steering shaft 30 is rotated by the operation of the engine 10 until the control switch mechanism is broken; and this operation of course takes place very is arrested. There is thus provided a relatively simple power means for supplementing the physical effort of the driver in the operation of steering the vehicle; for the driver may either subject the steering wheel with just enough force to distort the spring 100 to close the control switch or he may turn said wheel with a force greater than this amount. In either event the manual effort of the driver serves to supplement the operation of the engine 10 in the steering operation of the front wheels. If the power means fails for any reason then the steering operation is effected solely by the physical effort of the driver. It is apparent therefore that the steering mechanism of my invention is either operated solely by the physical effort of the driver or by the concurrent operation of the power means and the manual effort of the driver.

The above description is limited to a right turn operation of the steering mechanism however it will be apparent, from a study of the drawings and the description of the mechanism supra, that a left turn operation of said mechanism is accomplished by a rotation of the steering wheel in the opposite direction.

I claim:

1. Power and manually operated means adapted to effect the steering operation of the front wheels of an automotive vehicle, said means comprising a pitman arm, a steering wheel, force transmitting means, comprising a lost motion connection, interconecting the steering wheel and the pitman arm, a multi-motored engine operably connected to said force transmitting means, a distributor valve for controlling the operation of said engine and a master valve for initiating and cutting off the operation of the distributor valve said master valve being controlled by the operation of the steering wheel when said wheel is rotated to take up the lost motion of the aforementioned lost motion connection.

2. Power and manually operated means for actuating the steering mechanism of an automotive vehicle, said mechanism including a pitman arm, a steering wheel, force transmitting means, comprising a yieldable lost motion connection and a worm, interconnecting the steering wheel and pitman arm, a multi-motored engine operably connected to said force transmitting means, a distributor valve, comprising a casing and a rotatable valve member operably connected to the worm, for controlling the operation of said engine, and a master double three-way valve operable, by virtue of the operation of the aforementioned lost motion connection, to control the operation of said distributor valve.

3. In an automotive vehicle provided with a steering apparatus including a pitman arm and a manually operated steering wheel, power and manually operated means for actuating said pitman arm to effect a steering operation of the vehicle, said means comprising a multi-motored engine, force transmitting means interconnecting the power elements of said engine, the pitman arm and the steering wheel said force transmitting means including a yieldable lost motion connection included in the connection between the steering wheel and pitman arm, a distributor valve, including a rotable valve member operably connected to said power elements, for controlling the operation of said multi-motored engine, and a master valve, rendered operative when the steering wheel is rotated to take up the lost motion of the aforementioned lost motion connection, for 4. Power and manually operated or manually operated means for effecting the steering operation of the front wheels of an automotive vehicle, said means comprising a pitman arm, a manually operated steering wheel, force transmitting means, including a yieldable lost motion connection, interconnecting said pitman arm and steering wheel, a multi-motored engine having its power elements connected to one part of said force transmitting means, a distributor valve having a part connected to the latter force transmitting means part, for controlling the operation of said engine, and an electrically operated double three-way valve for initiating and cutting off the operation of said distributor valve said three-way valve being operated as a result of the operation of the aforementioned lost motion connection.

5. Power and manually operated or manually operated means for effecting the steering operation of the front wheels of an automotive vehicle including a manually operated steering wheel, a force transmitting member adapted to be connected to the drag link of the steering mechanism, force transmitting means, including a yieldable lost motion connection, for interconnecting the steering wheel and the aforementioned force transmitting member, a two motored engine having the power elements thereof operably connected to one part of the force transmitting means, a two-part distributor valve for controlling the operation of the motors of said engine, one part of said valve controlling one of said motors and the other part of said valve controlling the other of said motors, and a master control valve, operable as a result of the operation of the aforementioned lost motion connection, for initiating and for cutting off the operation of the distributor valve.

6. In an automotive vehicle provided with a steering mechanism including a pitman arm, a steering wheel and a steering column; power and manually operated means for effecting either a combined power and manual operation of the steering mechanism or a manual operation of said mechanism in the event of a failure of the power means, said means including a multi-motored vacuum engine mounted on the steering column, a rotary distributor valve for controlling the operation of said engine, a steering wheel controlled solenoid operated master valve for both initiating and cutting off the operation of the aforementioned distributor valve, and force transmitting means, interconnecting the steering wheel, pitman arm and the power elements of the vacuum engine.

7. Mechanism for actuating the pitman arm of a conventional automotive steering mechanism said mechanism comprising a multi-motored vacuum engine mounted on the lower end of the steering column of the steering mechanism, the power elements of the motors of said engine being connected with said pitman arm, a power operated rotary distributor valve for controlling the operation of said engine and a manually controlled master valve for initiating and cutting off the operation of the distributor valve.

THOMAS H. THOMAS.

REFERENCES CITED

The following references are of record in the file of this patent:

UNITED STATES PATENTS

| Number | Name | Date |
|---|---|---|
| 1,377,306 | Brush | May 10, 1921 |
| 2,077,747 | Edmondson | April 20, 1937 |

FOREIGN PATENTS

| Number | Country | Date |
|---|---|---|
| 563,664 | Germany | November 8, 1932 |
| 624,978 | France | April 16, 1927 |